United States Patent [19]
Tattersall et al.

[11] Patent Number: 5,106,109
[45] Date of Patent: Apr. 21, 1992

[54] CONVERTIBLE CART APPARATUS

[75] Inventors: Tammy J. Tattersall; Daniel M. Floodquist, both of Simi Valley, Calif.

[73] Assignee: Walters Kidde Aerospace Inc.

[21] Appl. No.: 685,885

[22] Filed: Apr. 16, 1991

[51] Int. Cl.⁵ .................. B62B 13/18; B62B 19/00
[52] U.S. Cl. .................... 280/9; 280/842; 280/18.1; 280/43.17; 280/43.24; 280/87.01; 152/9; 301/1; 301/111; 441/65; D21/228
[58] Field of Search ............ 280/7.1, 7.12, 8, 9, 280/11, 11.23, 12.13, 13, 14.2, 18.1, 24, 43, 43.14, 43.17, 43.24, 32.6, 47, 47.331, 79.2, 87.01, 87.021, 652, 842; 180/196; 114/344; 441/65; D21/228; 301/1, 111, 105 R; 152/8, 9, 5

[56] References Cited

U.S. PATENT DOCUMENTS

| | | | |
|---|---|---|---|
| 613,102 | 10/1898 | Wilson | 280/11 |
| 1,154,370 | 9/1915 | Burke | 280/9 |
| 1,164,332 | 12/1915 | Brown | 280/9 |
| 1,331,501 | 2/1920 | Heger | 280/9 |
| 1,364,684 | 1/1921 | Beck | 280/9 X |
| 3,062,254 | 11/1962 | Keefe | 152/9 X |
| 3,428,328 | 2/1969 | Lessig, III et al. | 280/43.17 |
| 3,677,571 | 7/1972 | Maturo, Jr. et al. | 280/47.3 X |
| 3,693,993 | 9/1972 | Mazzarelli et al. | 280/30 |
| 3,912,290 | 10/1975 | Rich | 280/9 |
| 4,077,452 | 3/1978 | Carn | 152/9 X |
| 4,316,615 | 2/1982 | Willette | 280/47.18 X |
| 4,618,157 | 10/1986 | Resnick | 280/655 X |
| 4,929,207 | 5/1990 | Piatt | 441/65 |

FOREIGN PATENT DOCUMENTS

| | | | |
|---|---|---|---|
| 916879 | 12/1946 | France | 280/8 |
| 2612078 | 9/1988 | France | 441/65 |

*Primary Examiner*—Andres Kashnikow
*Assistant Examiner*—Brian L. Johnson

[57] ABSTRACT

A cart formed with a concave top surface and a convex bottom surface mounting rollers medially of forward edges of each forward and rear edge and of the cart to permit use of the cart in a rolling or skidding orientation. The cart structure utilizes a plurality of spaced skids projecting below the bottom surface of the cart for enhanced skidding upon various surfaces, such as water, sand, and snow.

8 Claims, 5 Drawing Sheets

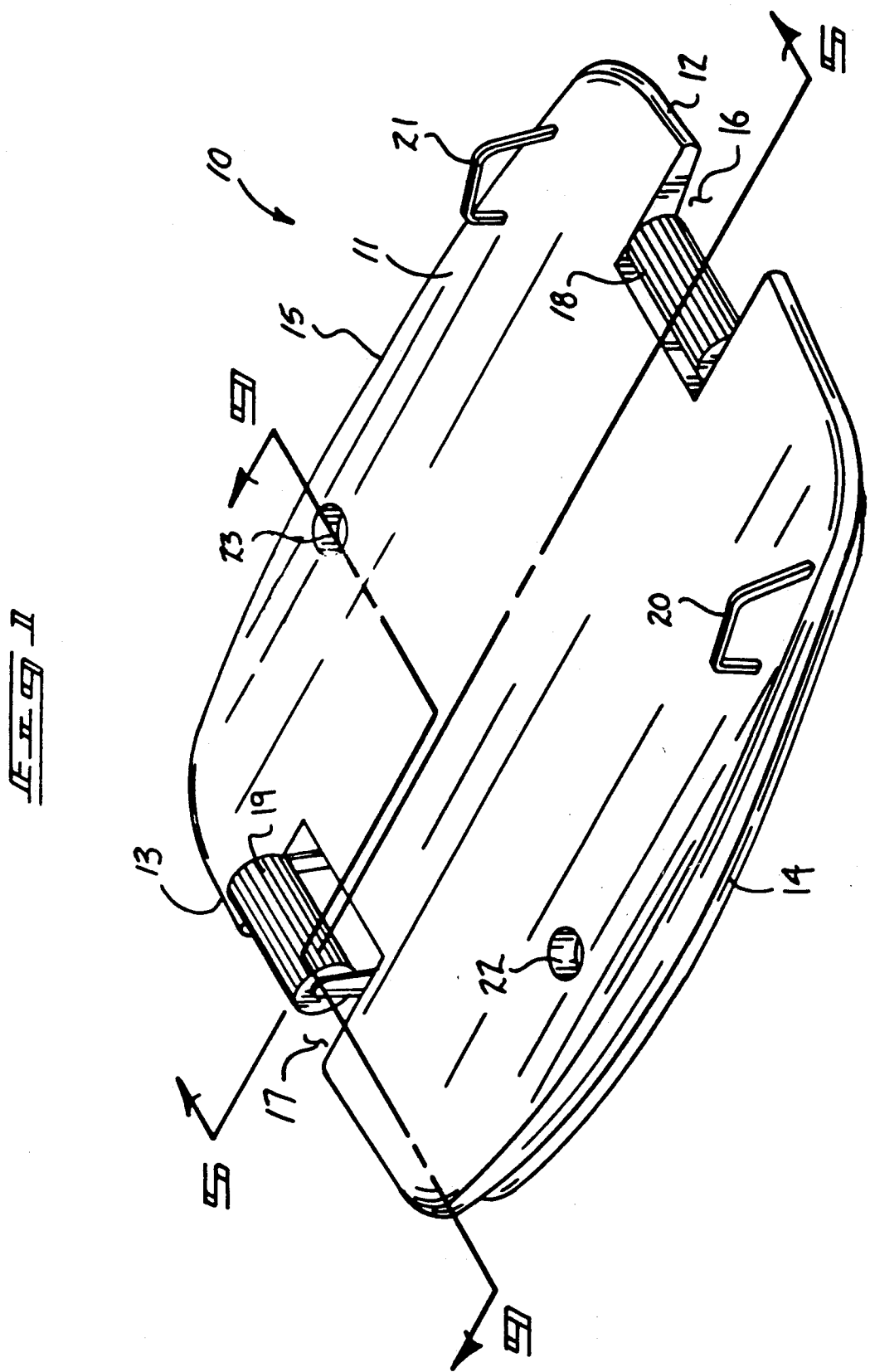

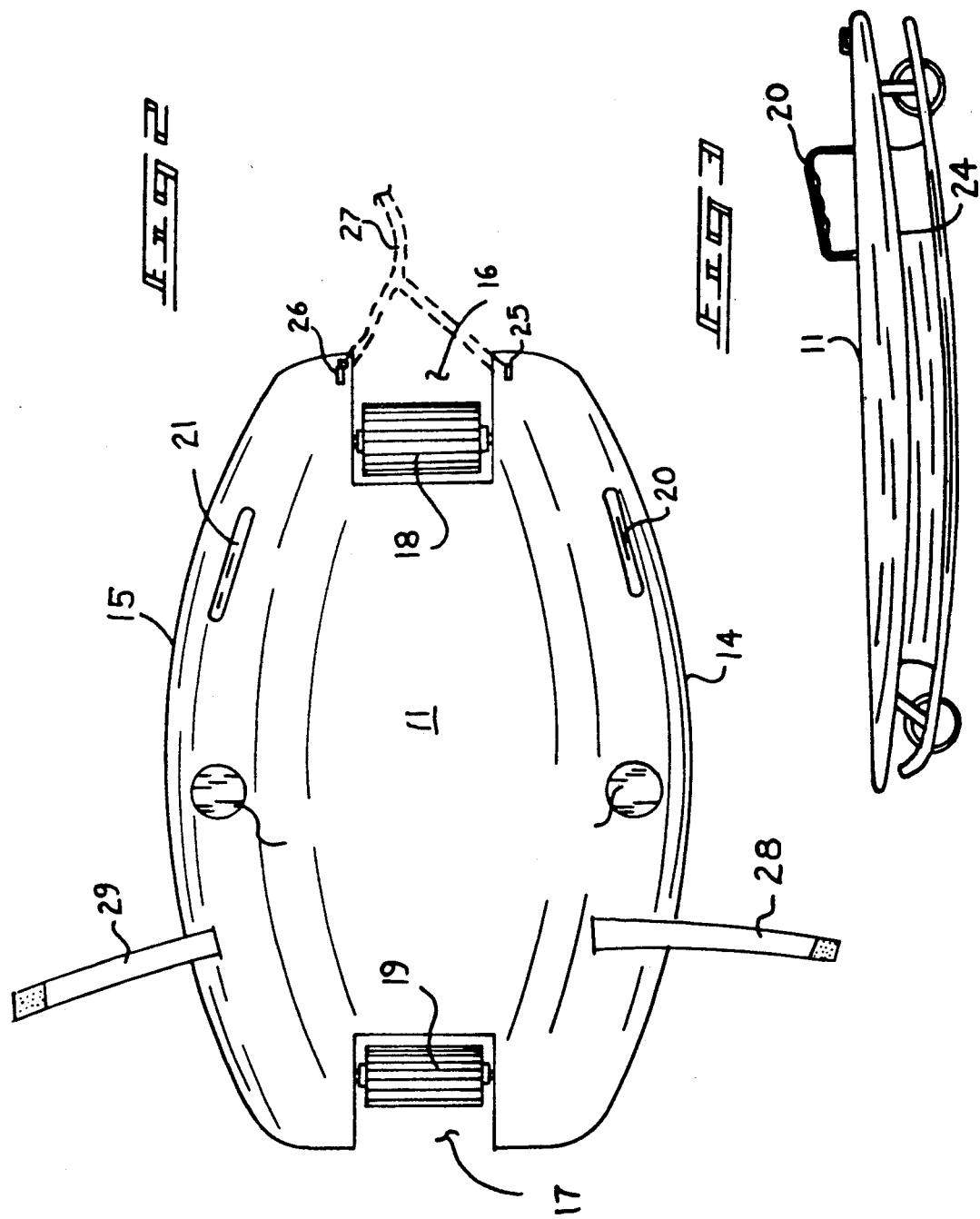

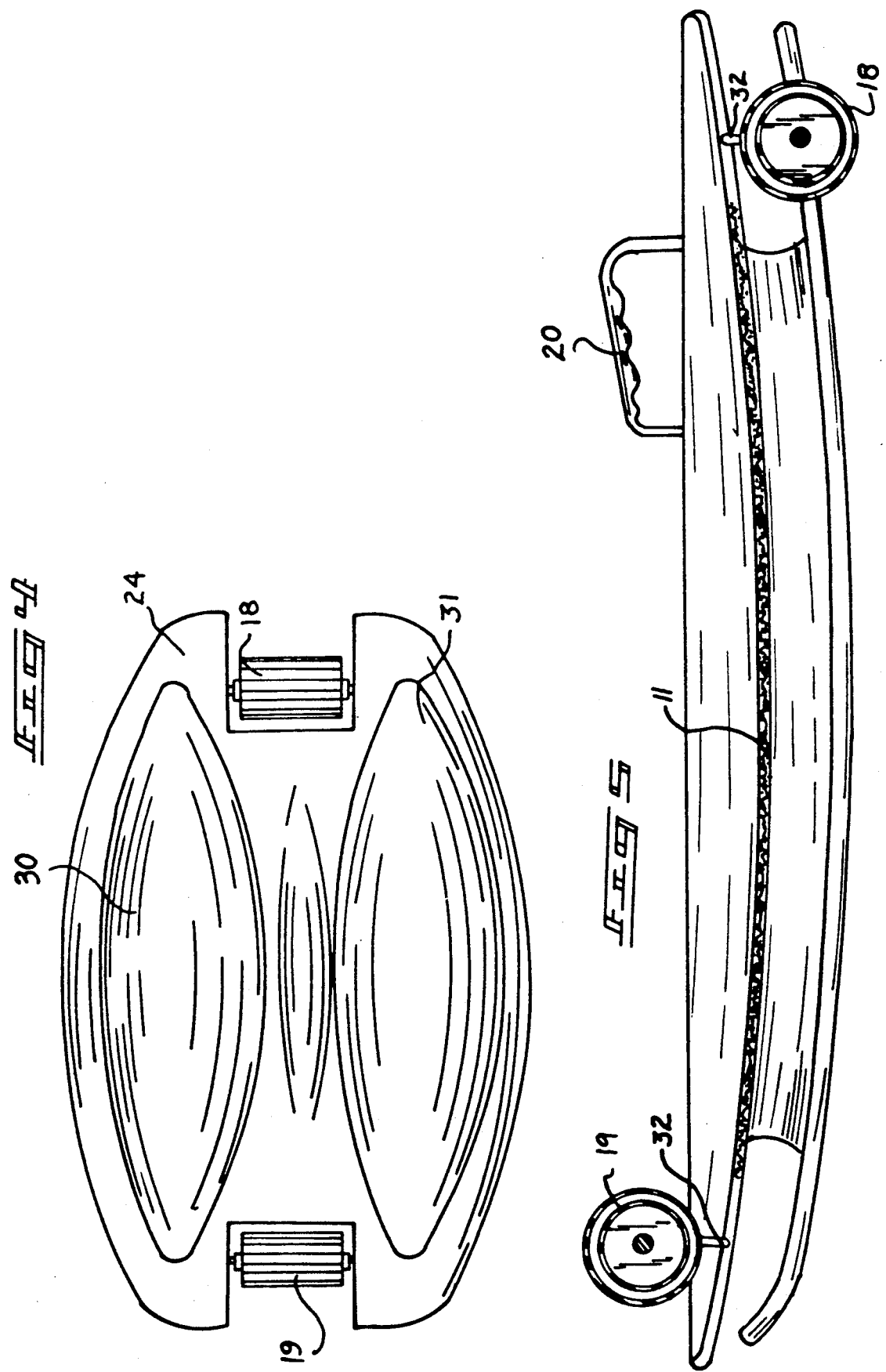

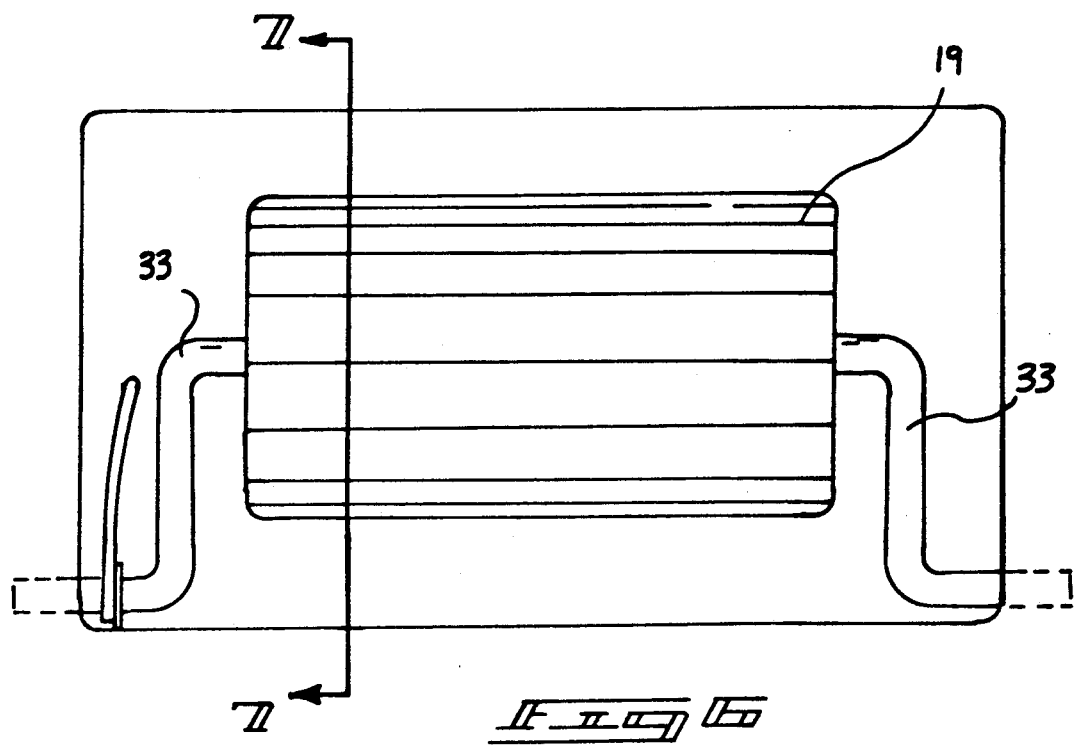
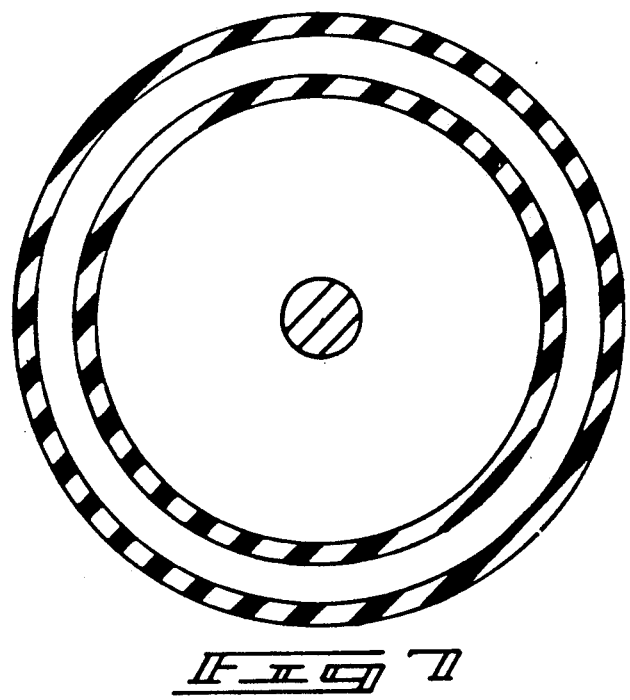

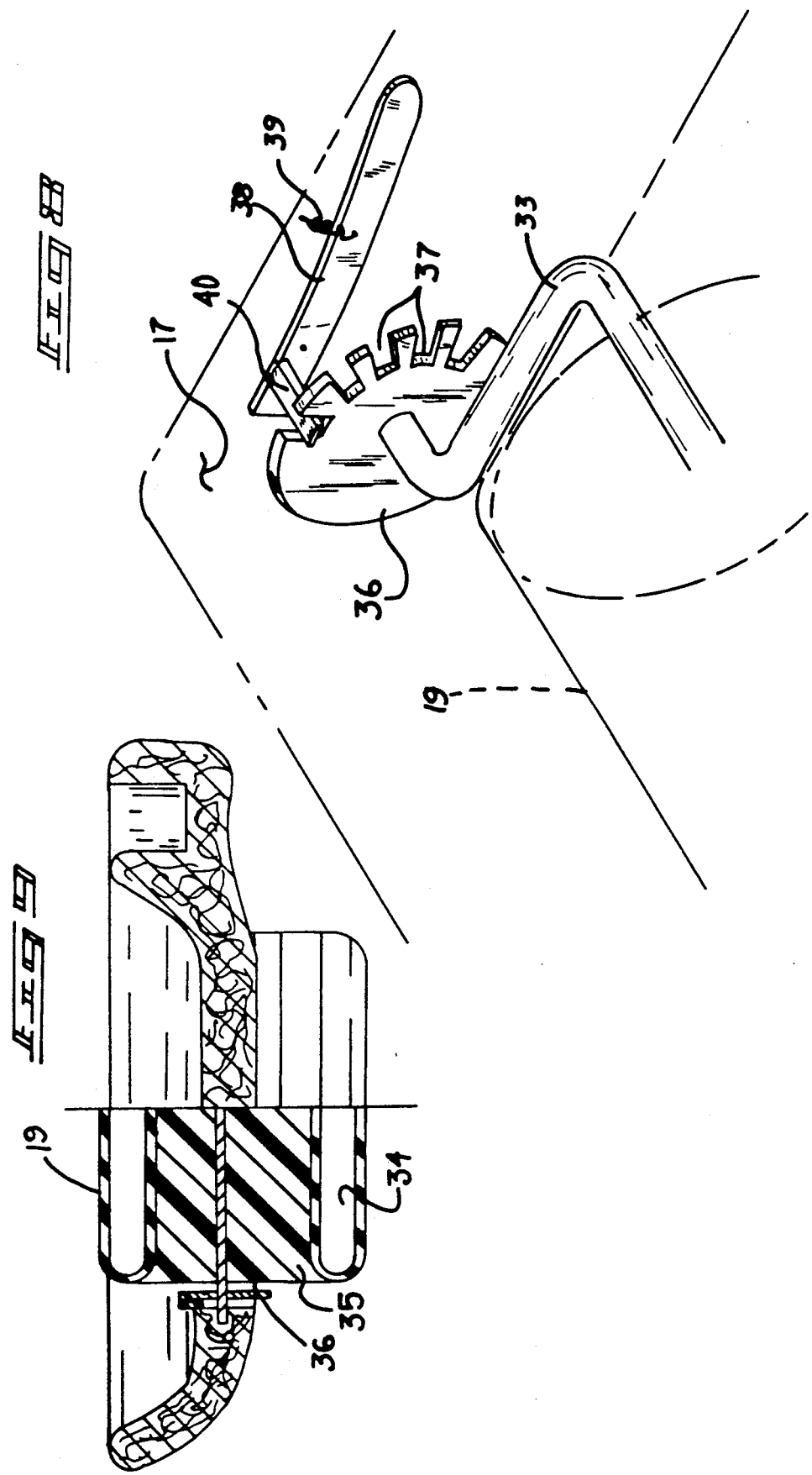

CONVERTIBLE CART APPARATUS

BACKGROUND OF THE INVENTION

1. Field of the Invention

The field of invention relates to cart structure, and more particularly pertains to a new and improved convertible cart apparatus wherein the same is arranged for either rolling or skidding selectively upon various surface for amusement and entertainment of individuals.

2. Description of the Prior Art

Various cart structure has been utilized in the prior art utilizing wheel structures to enhance ease of maneuverability of such organizations. Such structure for example is exemplified in U.S. Pat. No. 3,677,571 to Maturo, Jr., et al. setting forth a beach cart utilizing a unitary roller fixedly mounted to a framework for mounting various components within a mesh bag structure.

U.S. Pat. No. 4,618,157 to Rasnick sets forth a further example of a beach cart utilizing rollers mounted to a rear end portions of a skid for manipulation in skidding across a soft sand base.

U.S. Pat. Nos. 4,316,615 to Willette and 3,693,993 to Mazzarelli, et al. are further examples of cart structure that permit rolling mounting of various cart structure about an underlying surface.

As such, it may be appreciated that there continues to be a need for a new and improved convertible cart apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cart apparatus now present in the prior art, the present invention provides a convertible cart apparatus wherein the same is arranged for permitting skidding and rolling of the cart relative to a bottom surface of the cart structure. As such, the general purpose of the present invention, which will be described subsequently in greater detail, is to provide a new and improved convertible cart apparatus which has all the advantages of the prior art cart apparatus and none of the disadvantages.

To attain this, the present invention provides a cart formed with a concave top surface and a convex bottom surface mounting rollers medially of forward edges of each forward and rear edge and of the cart to permit use of the cart in a rolling or skidding orientation. The cart structure utilizes a plurality of spaced skids projecting below the bottom surface of the cart for enhanced skidding upon various surfaces, such as water, sand, and the like.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible cart apparatus which has all the advantages of the prior art cart apparatus and none of the disadvantages.

It is another object of the present invention to provide a new and improved convertible cart apparatus which may be easily and efficiently manufactured and marketed.

It is a further object of the present invention to provide a new and improved convertible cart apparatus which is of a durable and reliable construction.

An even further object of the present invention is to provide a new and improved convertible cart apparatus which is susceptible of a low cost of manufacture with regard to both materials and labor, and which accordingly is then susceptible of low prices of sale to the consuming public, thereby making such convertible cart apparatus economically available to the buying public.

Still yet another object of the present invention is to provide a new and improved convertible cart apparatus which provides in the apparatuses and methods of the prior art some of the advantages thereof, while simultaneously overcoming some of the disadvantages normally associated therewith.

Still another object of the present invention is to provide a new and improved convertible cart apparatus wherein the same utilizes pivotally mounted rollers mounted to forward and rear terminal ends of the cart structure in parallel relationship relative to one another to permit rolling or skidding of the cart relative to a surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention.

FIG. 3 is an orthographic side view of the instant invention.

FIG. 4 is an orthographic bottom view of the instant invention.

FIG. 5 is an orthographic cross-sectional illustration of the instant invention, taken along the lines 5—5 of FIG. 1 in the direction indicated by the arrows.

FIG. 6 is an orthographic end view of a typical roller utilized by the instant invention.

FIG. 7 is an orthographic view, taken along the lines 7—7 of FIG. 6 in the direction indicated by the arrows.

FIG. 8 is an isometric illustration of the adjustment mechanism utilized by each roller of the instant invention.

FIG. 9 is an orthographic partial cross-sectional illustration of the roller structure utilized by the instant invention, taken along the lines 9—9 of FIG. 1 in the direction indicated by the arrows.

DESCRIPTION OF THE PREFERRED EMBODIMENT

With reference now to the drawings, and in particular to FIGS. 1 to 9 thereof, a new and improved convertible cart apparatus embodying the principles and concepts of the present invention and generally designated by the reference numeral 10 will be described.

More specifically, the convertible cart apparatus 10 of the instant invention essentially comprises a body member defining a concave body top surface 11 coextensive with a convex arcuate bottom surface 24. The body includes a forward edge 12 spaced from and parallel to a rear edge 13, with arcuate right side edge 14 spaced a left side edge 15. The forward edge 12 includes a medially positioned forward recess 16 and a rear medially positioned recess 17 positioned medially of the rear edge 13. The forward and rear recesses 16 and 17 respectively mount a respective front and rear roller 18 and 19. Each roller is adjustably mounted within each recess to rotate through an arc of one hundred eighty degrees each from a lowered first position to a second horizontal position aligned with the body and a third position raised above the body. In the first position, the rollers project below arcuate right and left skids 30 and 31 respectively mounted in a spaced parallel relationship relative to one another extending below the arcuate bottom surface 24. When the rollers are in the first lowered position, the rollers are utilized for rolling about a support surface such as pavement and the like, whereupon in the second position, the rollers permit complete utilization of the skids and rollers not interrupting use of the concave bottom surface forward and rear end portions. While in the raised position, the rollers may be utilized as a support for the neck or head of an individual that may wish to lie down on the organization. A right and left handle 20 and 21 are mounted to the top surface 11 adjacent the respective right and left side edges 14 and 15 and adjacent the forward edge 12. Further, a respective right and left cylindrical cavity 22 and 23 are directed through the top surface 11 positioned rearwardly of the handles for mounting various drinking containers therewithin. The apparatus as illustrated in FIG. 2 further includes the use of a right and left strap 28 and 29 respectively mounted adjacent the right and left edges 14 and 15 permitting storage of various components on the top surface of the cart, wherein each strap utilizes hook and loop fastener surfaces permitting securement of the straps together. A right and left hook 25 and 26 are mounted orthogonally relative to the forward edge 12 (see FIG. 2) in a spaced parallel relationship for mounting a tow rope member 27 thereon permitting the tow rope to be fastened to a tow vehicle, such as a boat, automobile, and the like.

Each roller 18 and 19 utilizes pivot linkage 32 to permit pivotment of the rollers from the first raised position to the second horizontal position, and finally to the third lowered position independently from one another. To accomplish this, the pivot linkage 32 includes a plurality of "S" shaped axle supports 33, wherein the axle supports are directed at interior ends of each axle support coaxially of an associated roller, wherein at least one of the "S" shaped axle supports 33 has mounted at its outer terminal end a toothed adjuster wheel 36 formed with a slotted periphery 37, wherein the slotted periphery 37 is cooperative with a locking tab 40 mounted to a pivotally mounted adjusting lever 38 mounted within an associated recess 16 or 17 and utilizing a spring 39 to normally bias the locking tab 40 within one of the slots of the slotted periphery 37 to permit adjustment of the associated roller in a preferred position of the three positions as noted above. Further, each roller is formed with a central cylindrical solid core 35 formed of a polymeric material, wherein a pneumatic cylindrical periphery 34 extends about the cylindrical periphery of each central core to provide pneumatic cushioning for enhanced comfort and use of the organization. Further, it should be noted that the arcuate top surface and arcuate bottom surface of the body portion of the organization is generally formed with a non-skid roughened surface to enhance positioning of an individual on the organization during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A convertible cart apparatus, comprising in combination,
    an elongate body member, the body member including a concave body top surface and a convex body bottom surface, and the body member including a forward edge spaced from and parallel to a rear edge, and an arcuate right side spaced from an arcuate left side, and a forward recess having first spaced side portions, the forward recess positioned medially of the forward edge, and a rear recess having second spaced side portions, the rear recess positioned medially of the rear edge, wherein the forward and rear recesses are in an aligned relationship relative to one another, and first linkage means for pivotally mounting a front roller to the first spaced side portions for pivotal movement within the forward recess, and second linkage means for pivotally mounting a rear roller to the second spaced side portions for pivotal movement within the rear recess, wherein the front and rear rollers are in a parallel spaced relationship relative to one another, and a right handle mounted to the top surface adjacent the right side, and a left handle mounted to the top surface adjacent the left side, and the right handle and the left handle orthogonally oriented and adjacent the forward edge.

2. An apparatus as set forth in claim 1 wherein each roller includes adjustment means interconnected between each roller and each recess side portion for effecting adjustment of each roller through one hundred eighty degrees of arc.

3. An apparatus as set forth in claim 2 wherein the adjustment means includes a plurality of serpentine link members rotatably mounting each roller, and at least one of said link members of each roller including a toothed adjuster wheel mounted to the at least one link member, wherein the toothed adjuster wheel includes a slotted periphery, and a pivoting adjuster lever mounted within each recess of the forward and rear recesses, wherein each adjusting lever includes a locking tab mounted to the lever for operative association with the slotted periphery of the toothed adjuster wheel, and a spring member mounted to each adjuster lever and to the body member within each recess for maintaining each locking tab in operative association with each adjuster wheel.

4. An apparatus as set forth in claim 3 wherein each roller includes a central solid polymeric cylindrical core, and further includes a pneumatic cylindrical periphery.

5. An apparatus as set forth in claim 4 wherein the body member includes a right and left hook mounted thereto with the right and left hooks orthogonally oriented relative to the forward edge and positioned in a spaced relationship relative to the forward recess, and the right and left hooks including a tow rope member mounted to the right and left hooks permitting the tow rope member for securement to a tow vehicle.

6. An apparatus as set forth in claim 5 including a right strap mounted to the body member adjacent the right edge, and a left strap mounted to the body member adjacent the left edge, wherein the right and left straps each include a hook and loop fastener surface permitting attachment of the right and left straps relative to one another adapted for securement of articles to the top surface.

7. An apparatus as set forth in claim 6 including a plurality of cylindrical recesses mounted within the arcuate top surface for receiving drinking cup members therewithin.

8. An apparatus as set forth in claim 7 wherein each roller is adjusted from a first position spaced above the top surface to the second position horizontally aligned with the body member within each recess, and to a third lower position spaced below the concave bottom surface, and the concave bottom surface further includes a plurality of skid members, the skid members extend below the arcuate bottom surface, and the skid members are in a spaced parallel relationship relative to one another, with each of said rollers spaced below the skid members when in the third lowered position.

* * * * *